US011256083B2

United States Patent
McDonald et al.

(10) Patent No.: US 11,256,083 B2
(45) Date of Patent: Feb. 22, 2022

(54) MEMS ELECTROSTATIC ACTUATOR WITH LINEARIZED DISPLACEMENTS

(71) Applicant: TEXAS INSTRUMENTS INCORPORATED, Dallas, TX (US)

(72) Inventors: William Craig McDonald, Allen, TX (US); James Norman Hall, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 460 days.

(21) Appl. No.: 16/233,812

(22) Filed: Dec. 27, 2018

(65) Prior Publication Data

US 2020/0209614 A1  Jul. 2, 2020

(51) Int. Cl.
*G02B 26/08* (2006.01)
*H02N 1/00* (2006.01)

(52) U.S. Cl.
CPC ......... *G02B 26/0841* (2013.01); *H02N 1/006* (2013.01)

(58) Field of Classification Search
CPC .... G02B 26/0841; G02B 26/08; H02N 1/006; H02N 1/00
See application file for complete search history.

(56) References Cited

U.S. PATENT DOCUMENTS

| | | | |
|---|---|---|---|
| 5,212,582 A | 5/1993 | Nelson | |
| 5,606,441 A | 2/1997 | Florence et al. | |
| 5,719,695 A | 2/1998 | Heimbuch | |
| 6,028,689 A | 2/2000 | Michalicek et al. | |
| 6,329,738 B1 | 12/2001 | Hung et al. | |
| 6,542,282 B2 | 4/2003 | Smith et al. | |
| 6,625,343 B2 * | 9/2003 | Kato | G02B 6/3514 385/18 |
| 6,867,897 B2 | 3/2005 | Patel et al. | |
| 6,897,991 B2 | 5/2005 | Huffman et al. | |
| 7,106,491 B2 | 9/2006 | Meyer et al. | |
| 7,477,440 B1 | 1/2009 | Huang | |
| 7,977,897 B2 | 7/2011 | Schenk | |

(Continued)

FOREIGN PATENT DOCUMENTS

| | | |
|---|---|---|
| CN | 102981272 A | 3/2013 |
| JP | 2013171219 A | 9/2013 |

OTHER PUBLICATIONS

International Search Report for PCT/US2018/064754 dated Apr. 4, 2019, 3 pages.

(Continued)

*Primary Examiner* — Balram T Parbadia
(74) *Attorney, Agent, or Firm* — Michelle F. Murray; Charles A. Brill; Frank D. Cimino (57) ABSTRACT

A microelectromechanical actuator for a light beam steering device is provided that includes memory cells coupled to at least one electronic circuitry component and electrode segments coupled to a respective one of the memory cells via the at least one electronic circuitry component. A flexible metal layer having support pillars is on the electrode segments. Flexible beams are attached to the support pillars and a movable electrode attaches to the flexible beams. A mirror is attached to the movable electrode. When one or more of the electrode segments is activated, the mirror is displaced a distance to steer a light beam output from a light source in a direction.

20 Claims, 7 Drawing Sheets

(56) References Cited

U.S. PATENT DOCUMENTS

| | | | |
|---|---|---|---|
| 2002/0057484 A1* | 5/2002 | Mori | G02B 26/0841 359/291 |
| 2003/0168928 A1 | 9/2003 | Clark et al. | |
| 2004/0160118 A1 | 8/2004 | Knollenberg et al. | |
| 2004/0188592 A1* | 9/2004 | Watanabe | G01J 1/32 250/205 |
| 2004/0248417 A1 | 12/2004 | Malone | |
| 2005/0185250 A1 | 8/2005 | Novotny et al. | |
| 2006/0023994 A1* | 2/2006 | Ko | G02B 26/0841 385/18 |
| 2006/0119922 A1 | 6/2006 | Faase et al. | |
| 2007/0053052 A1* | 3/2007 | Pan | B81B 3/0051 359/291 |
| 2008/0013145 A1* | 1/2008 | Chui | G02B 26/001 359/224.1 |
| 2008/0122822 A1* | 5/2008 | Pan | G02B 26/0841 345/211 |
| 2009/0128888 A1* | 5/2009 | Ichikawa | G09G 3/346 359/295 |
| 2010/0046062 A1* | 2/2010 | Maeda | G02B 26/0833 359/291 |
| 2010/0067094 A1* | 3/2010 | Sugimoto | H04N 9/315 359/291 |
| 2010/0265563 A1* | 10/2010 | Zhong | B81B 3/0072 359/290 |
| 2013/0278912 A1 | 10/2013 | Owa et al. | |
| 2017/0003392 A1 | 1/2017 | Bartlett et al. | |
| 2017/0328989 A1 | 11/2017 | Barlett et al. | |
| 2019/0179134 A1 | 6/2019 | Fruehling et al. | |

OTHER PUBLICATIONS

International Search Report for PCT/US2018/064757 dated Apr. 11, 2019, 2 pages.

R.W. Gerchberg and W.O.Sexton, "A Practical Algorithm for the Determination of Phase From Image and Diffraction Plane Pictures", Optik, vol. 35, No. 2, (1972), retrieved Oct. 14, 2019 from the uniform resource locator, pp. 1-6, (URL):https://antoine.wojdyla.fr/assets/archive/gerchberg_saxton1972.pdf.

Bifano, Thomas et. al., "Large-scale metal MEMS mirror arrays with integrated electronics", Design, Test, Integration and Packaging of MEMS/MOEMS 2002, Proceedings of the SPIE, vol. 4755, pp. 467-746, 2002; retrieved Oct. 15, 2019 from the uniform resource locator (URL): http://people.bu.edu/tgb/PDF_files/17_DTIPSLM.pdf.

Bartlett, Terry et. al., "Adapting Texas Instruments (TI) DLP technology to demonstrate a phase spatial light modulator", Emerging Digital Micromirror Device Based Systems and Applications XI, Proceedings of the SPIE, vol. 10932 (Mar. 4, 2019), 13 pages.

Extended European Search Report dated Feb. 17, 2021, European Application No. 18885789.0, 10 pages.

International Search Report and Written Opinion dated Jan. 28, 2021, PCT/US2020/055721, 9 pages.

Gu, H., et al., "Pseudo-Analog Electrostatic Piston Micromirror," MEMS Adaptive Optics IV, Proceedings of SPIE, http://proceedings.spieddigitallibrary.org, vol. 7595, No. 75950P, 6 pages.

* cited by examiner

MEMS ELECTROSTATIC ACTUATOR WITH LINEARIZED DISPLACEMENTS

TECHNICAL FIELD

This relates to micromechanical systems (MEMS) and more specifically to a MEMS electrostatic actuator having linearized displacements.

BACKGROUND

Micromirrors based on micromechanical systems (MEMS) technology have been widely used in light display, optical communication and light-beam steering applications. Light-beam steering devices can utilize an electrostatic, piston type actuator to move the micromirrors in an up and down fashion. When the piston type actuator is activated, the micromirrors move or are displaced by a fraction of a wavelength of the light source. The displacement of the micromirror steers a light beam from the light source to a desired direction. A voltage-displacement profile of an electrostatic actuator, however, is inherently non-linear for displacements approaching a critical pull-in threshold (e.g., approximately $\frac{1}{3}$ of the electrostatic gap for a parallel-plate actuator). This non-linearity is inherent in both analog and digital electrode configurations.

SUMMARY

In an example, a device includes a base, at least one electronic circuitry component housed in the base, and memory cells housed in the base and coupled to the at least one electronic circuitry component. The device further including a fixed electrode plate layer on the base, where the fixed electrode plate layer including at least first and second electrode segments being coupled to a first one of the memory cells via the at least one electronic circuitry component, and the second electrode segment being coupled to a second one of the memory cells via the at least one electronic circuitry component. A movable electrode layer having support pillars is on the fixed electrode plate layer, flexible beams are attached to the support pillars, and a movable electrode plate is attached to the flexible beams. A mirror layer is on the movable electrode layer, the mirror layer including a mirror on one side of the mirror layer. The first electrode segment being configured to activate or deactivate based on a state of the first one of the memory cells, the second electrode segment being configured to activate or deactivate based on a state of the second one of the memory cells; and the mirror layer being configured to move by a distance responsive to: activation or deactivation of the first electrode segment; and activation or deactivation of the second electrode segment.

In another example, a light beam steering device comprising a controller having a logic controller, a light source controlled by the controller, and a microelectromechanical electrostatic actuator. The micromechanical electrostatic actuator including at least one electronic circuitry component. memory cells coupled to the at least one electronic circuitry component, and a fixed electrode plate layer including at least first and second electrode segments the first electrode segment being coupled to a first one of the memory cells via the at least one electronic circuitry component, and the second electrode segment being coupled to a second one of the memory cells via the at least one electronic circuitry component. Support pillars are on a perimeter of the fixed electrode plate layer and flexible beams are attached to the support pillars. A movable electrode plate is attached to the flexible beams and a mirror is attached to the movable electrode plate. The first electrode segment being configured to activate or deactivate based on a state of the first one of the memory cells, the second electrode segment being configured to activate or deactivate based on a state of the second one of the memory cells; and the mirror layer being configured to move by a distance responsive to: activation or deactivation of the first electrode segment; and activation or deactivation of the second electrode segment.

In another example, a method of operating a microelectromechanical electrostatic actuator comprising addressing at least one memory cell to an "ON" state from an "OFF" state and applying a voltage to at least a first and second electrode segment or a combination of the at least first and second electrode segments via at least one electronic circuitry component coupled to the at least one memory cell. The method further comprising displacing a movable electrode in a direction toward the at least first and second electrode segment or the combination of the at least first and second electrode segments and steering a light beam output from a light source in a direction.

DETAILED DESCRIPTION

Disclosed herein is a micromechanical electrostatic actuator that includes an electrode plate configuration having multiple electrode segments to achieve a linear voltage-displacement profile. A voltage-displacement profile of an electrostatic actuator is inherently non-linear for displacements approaching a critical pull-in threshold (e.g., approximately $\frac{1}{3}$ of the electrostatic gap for a parallel-plate actuator). This non-linearity is inherent in both analog and digital electrode configurations illustrated in FIG. 1 and FIG. 2 respectively.

Figure 1:
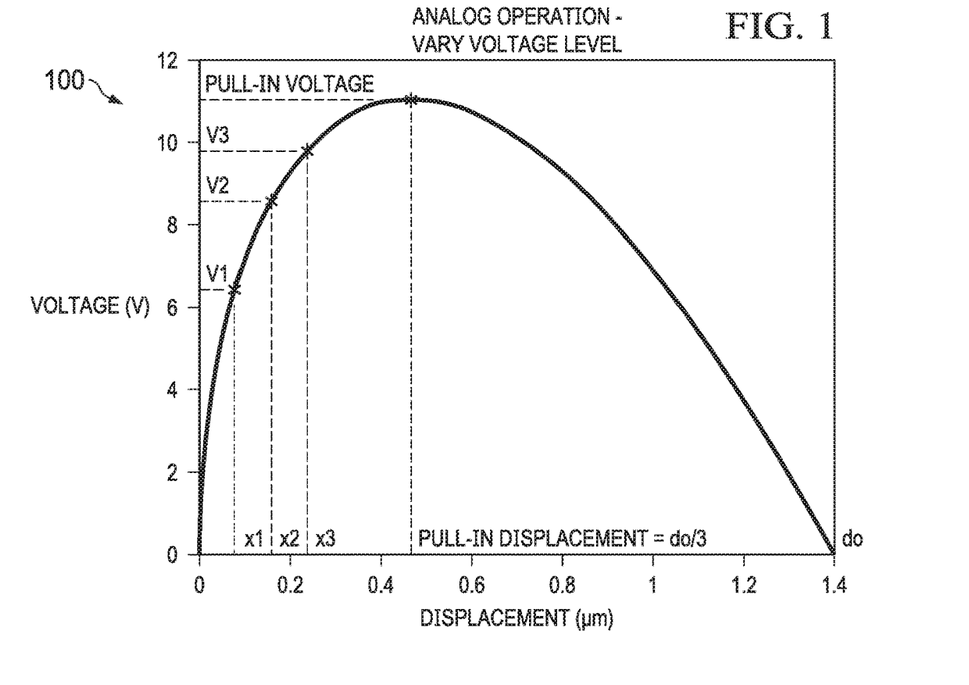
FIG. 1 is a voltage-displacement profile graph illustrating non-linearity of an analog electrode configuration for an electrostatic actuator.

Referring to FIG. 1, the analog electrode configuration includes an electrode plate having a single electrode. During operation, different voltages are applied to the single electrode to obtain target displacements. As illustrated in the graph 100 in FIG. 1, although the displacement is linear, the applied voltages are not linear. Thus, resulting in a non-linear voltage-displacement profile.

Figure 2:
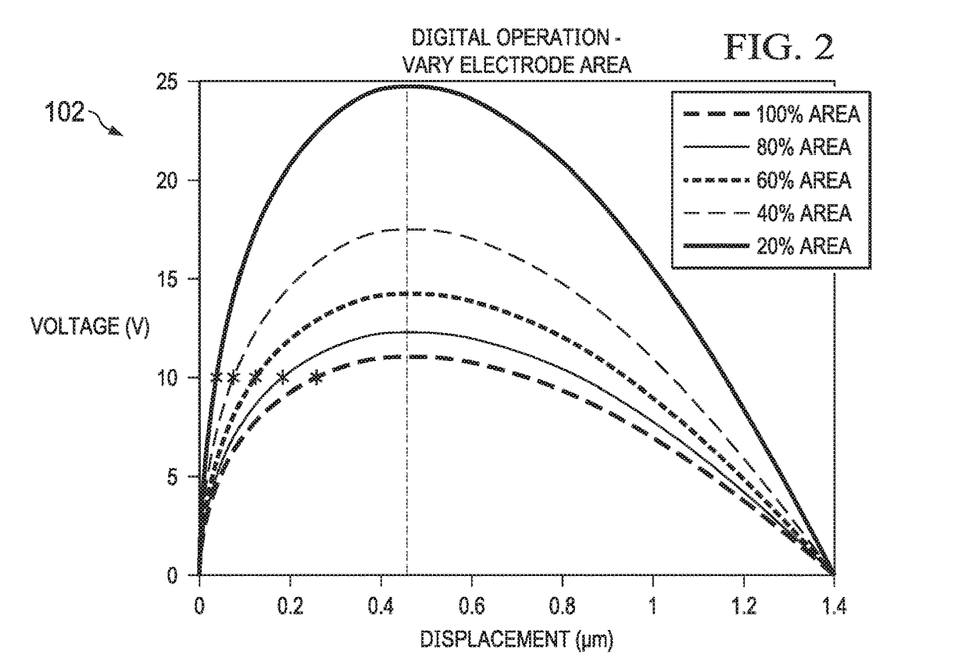
FIG. 2 is a voltage-displacement profile graph illustrating non-linearity of a digital electrode configuration for an electrostatic actuator.

Referring to FIG. 2, the digital electrode configuration includes an electrode divided into multiple segments where the multiple segments have a different electrode area. During operation, the electrode segments are activated (e.g., energized) at the same voltage (e.g., 10 v). As illustrated in the graph 102 in FIG. 2, although the applied voltage is linear, in this case the displacement is non-linear. As a result, the voltage-displacement profile is non-linear.

The micromechanical electrostatic actuator disclosed herein, however, solves the non-linearity of the voltage-displacement profile by including an electrode metal layer (e.g., plate) that is partitioned or divided into (N−1) electrode segments where N is the number of positions required for a linear voltage-displacement profile. In other words, if the number of positions required to achieve linearity is N, where N includes a zero displacement position plus N−1 displaced positions, then the number of electrode segments required is N−1 because no electrodes are required to be activated in the zero displacement position. In the N−1 displaced positions, one or more electrode segments are activated. A size or area of the multiple electrode segments are chosen based on electromechanical design simulations and depends on the non-linearity as a result of the initial electrostatic gap and maximum target displacement. The target displacements are achieved by activating (e.g., energizing) the appropriate electrode segment or a combination of electrode segments. The multiple electrode segments are coupled to a respective memory cell that is individually addressable to an "ON" (1) state or an "OFF" (0) state. An "ON" state addressed to one or more memory cells activates the respective electrode segment or a combination of electrode segments to displace micromirror a distance to thereby steer a light beam in an intended direction subsequently described.

Figure 3:
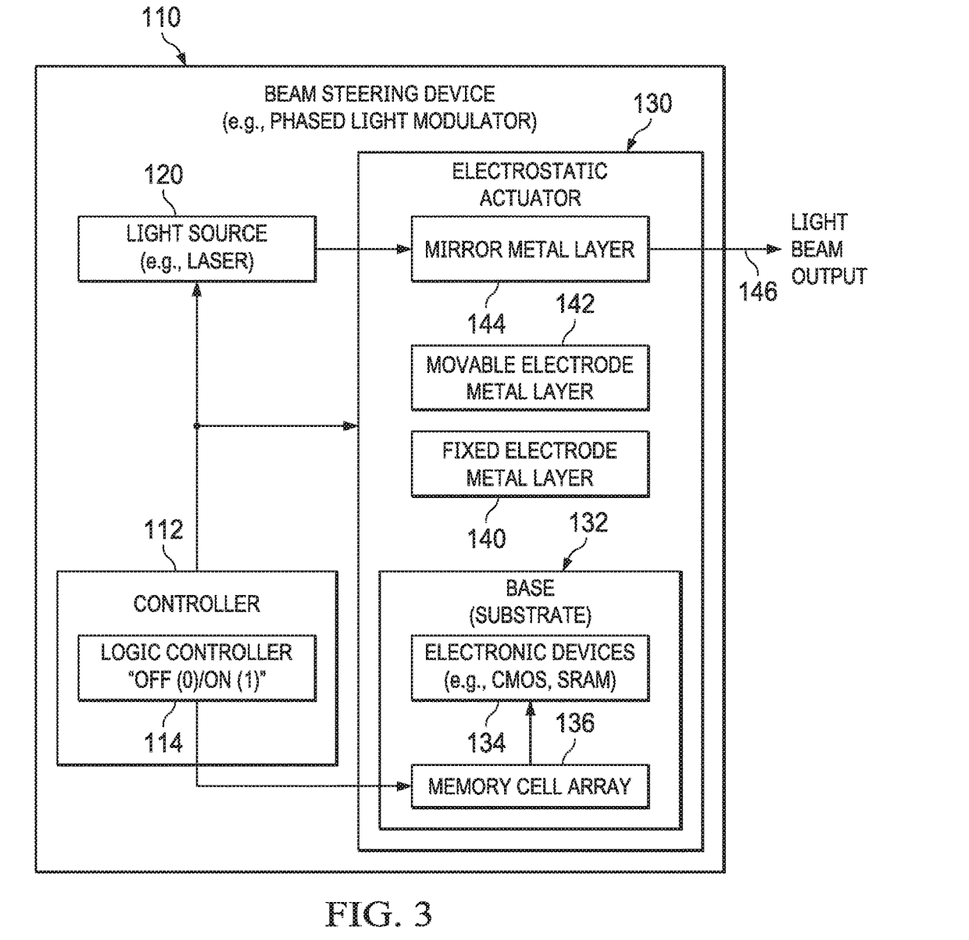
FIG. 3 is a block diagram of an example light beam steering device.

FIG. 3 is a block diagram of an example light beam steering device 110 such as a phased light modulator that includes a controller 112, a light source (e.g., laser) to produce a light beam, and an electrostatic actuator 130. The light beam steering device 110 may be used in light beam steering applications such as, optical trapping, beam steering and shaping, femtosecond pulse shaping, adaptive optics, imaging applications, 3D printing, and holography. Beam steering devices utilize mirrors to reflect or steer light in a direction where the light is needed. In one example, the mirrors in the beam steering device may include a diffractive optical element that steers a single incident beam at several different positions along a propagation axis.

The controller 112 provides control to the light source 120 and to the electrostatic actuator 130. The controller 112 includes a logic controller 114 that, during operation of the light beam steering device 110, turns the memory cells to an "ON" or "OFF" state. In addition, based on the state of the ON/OFF state of the memory cells, the controller 112 displaces the micromirrors a distance to steer the light from the light source 120 in an intended direction.

Figure 4:
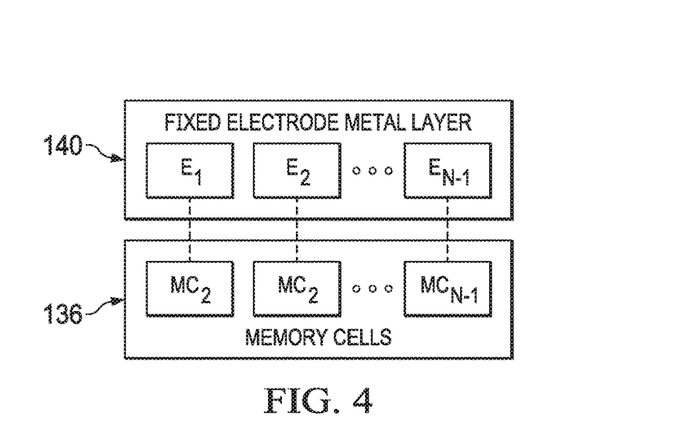
FIG. 4 is a block diagram illustration illustrating the relationship between electrode segments and memory cells of the example light beam steering device of FIG. 3.

Still referring to FIG. 3 and also to FIG. 4, the electrostatic actuator 130 includes a base (substrate) 132 that houses electronic circuitry components (e.g., CMOS, SRAM, etc.) 134 and memory cells 136. Based on the ON/OFF state of the memory cells 136, the electronic circuitry components 134 apply a voltage (e.g., 10 v) to one or more electrode segments (described further below). The memory cells 136 include "N−1" number of memory cells $MC_1$, $MC_2$ . . . , $MC_{N-1}$, where "N" is the number of target displacements required to obtain a linearized voltage-displacement profile. The memory cells $MC_1$, $MC_2$, . . . , $MC_{N-1}$ are associated with a respective electrode segment. When one or more memory cells $MC_1$, $MC_2$, . . . , $MC_{N-1}$ are addressable to the "ON" ("1") state, the respective electrode segment or segments are activated via the electronic circuitry components 134. As explained in more detail below, activation of one or more electrode segments displaces the micromirror to steer the light beam from the light source in the intended direction.

Still referring to FIGS. 3 and 4, the electrostatic actuator 130 further includes multiple metal layers comprising a fixed electrode metal layer (hereinafter "electrode layer") 140 on the base 132, a movable (e.g., flexible, hinged) electrode metal layer (hereinafter "movable electrode layer") 142 on the electrode layer 140, and a mirror metal layer (hereinafter "mirror layer") 144 on the movable electrode layer 142. As illustrated in FIG. 4, the electrode layer 140 is divided into electrode segments $E_1$, $E_2$, . . . , $E_{N-1}$ where the multiple electrode segments $E_1$, $E_2$, . . . , $E_{N-1}$ c are associated with a respective memory cell $MC_1$, $MC_2$, . . . , $MC_{N-1}$ housed in the base 132 mentioned above.

Specifically, referring to Table 1 below, the number of electrode segments $E_1$, $E_2$, . . . , $E_{N-1}$ is equal to the number of memory cells $MC_1$, $MC_2$, . . . , $MC_{N-1}$, where, as mentioned above, N is the is the number of target displacements required to obtain a linearized voltage-displacement profile. In addition, the total number of addressable displacement states for the memory cells $MC_1$, $MC_2$, . . . , $MC_{N-1}$ is $2^{(N-1)}$. The number of addressable displacements states to achieve a linearized displacement, and ultimately a linear voltage-displacement profile, however, is a subset of the total number of addressable displacement states. For example, as illustrated in Table 1 below, if the number of target displacements to achieve linearity is N=4, then the number of electrode segments and respective memory cells required is N−1 or 3. The total number of memory cell addressable states is $2^{(N-1)}$ or 8. Thus, the number of memory cell addressable displacements states required for linearity is a subset of the total number of memory cell addressable displacement states.

TABLE 1

| | Nomenclature | Example Two Position | Example Three Position | Example Four Position |
|---|---|---|---|---|
| Number of Target Displacements | N | 2 | 3 | 4 |
| Total Number of Electrode Segments | N − 1 | 1 | 2 | 3 |
| Total Number of Memory Cell Addressable Displacement States | $2^{(N-1)}$ | 2 | 4 | 8 |

Still referring to FIGS. 3 and 4, the movable electrode layer 142 flexes or hinges via multiple flexible beams in a direction toward the electrode layer 140 when one or more electrodes $E_1$, $E_2$, . . . , $E_{N-1}$ are activated. In other words, as will be described further below, the hinged layer includes an electrode plate that is attracted to the electrode layer 140 when one or more of the electrodes $E_1, E_2, \ldots, E_{N-1}$ are activated. Thus, when one or more of the electrodes $E_1, E_2, \ldots, E_{N-1}$ are activated, the electrode plate is displaced a distance toward the electrode layer 140.

The mirror layer 144 includes a mirror that steers the light beam from the light source 120 in a given direction. The mirror layer 144 is supported by multiple support structures that are on the electrode plate of the movable electrode layer 142. Thus, when the electrode plate is displaced, the mirror layer and, hence, the mirror is displaced by the same distance to thereby steer the light beam in the direction to produce a light beam output 146.

Figure 5:
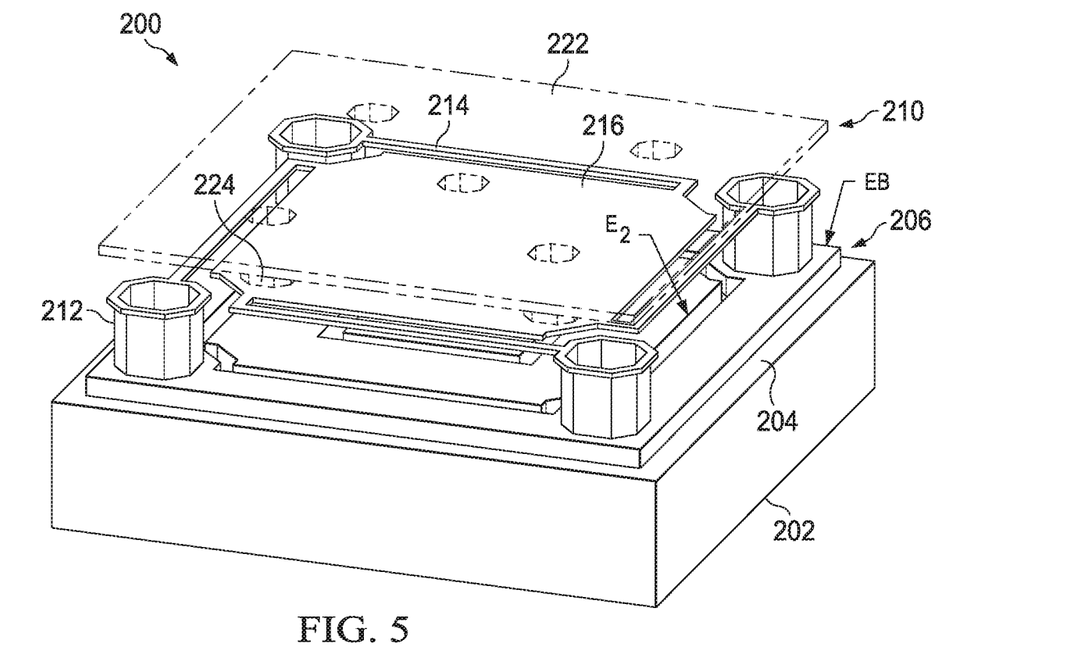
FIGS. 5 and 6 are perspective views of an example electrostatic actuator.
Figure 6:
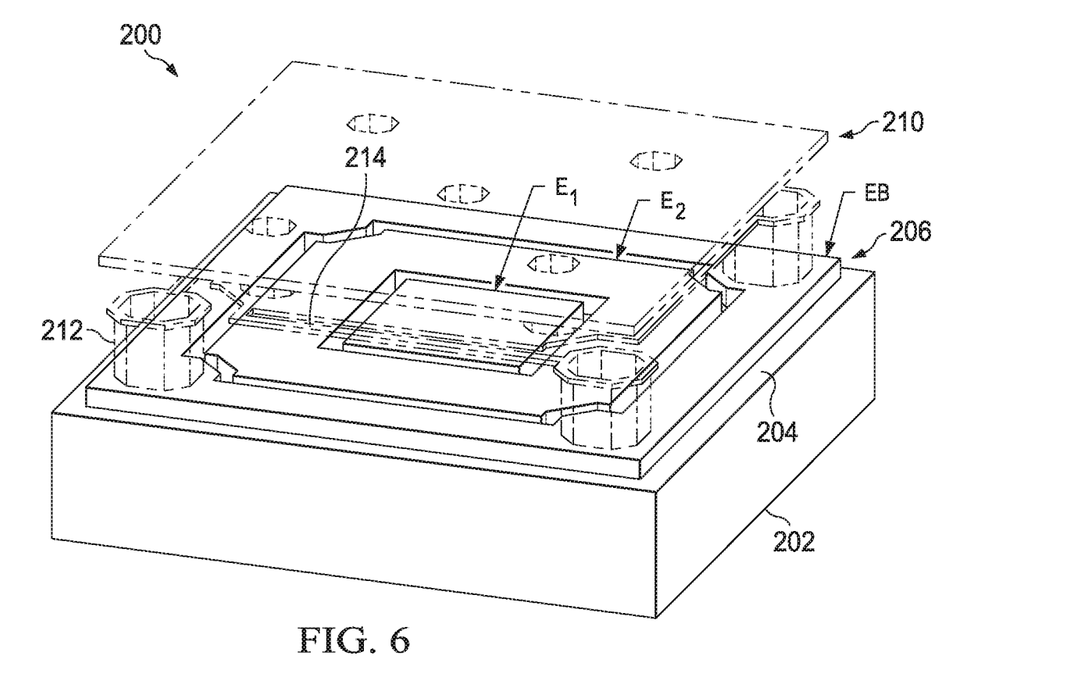
Figure 7:
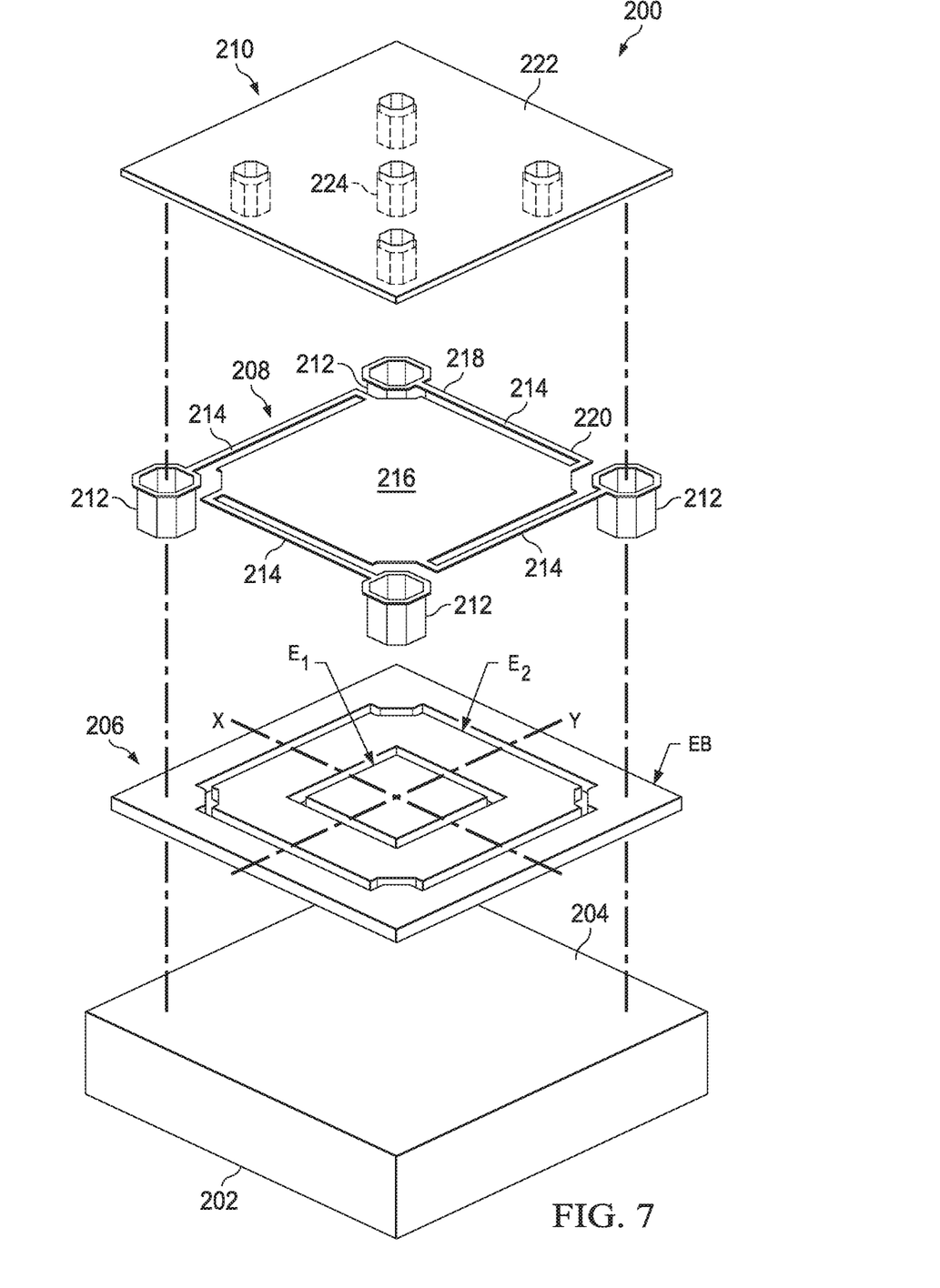
FIG. 7 is an exploded view of an example electrostatic actuator.

FIGS. 5 and 6 are perspective views and FIG. 7 is an exploded view of an example electrostatic actuator 200 (e.g., piston-mode actuator) similar to the electrostatic actuator 130 illustrated in FIG. 3. The electrostatic actuator 200 is a 2-electrode, 3-position actuator and can be used in beam steering devices such as a phased light modulator. The actuator 200 includes a base (substrate) 202 having a mounting surface 204. As described above and illustrated in FIG. 3, the base 202 houses electronic circuitry components (e.g., CMOS, SRAM, etc.) and memory cells.

The electrostatic actuator 200 further includes multiple metal layers on the mounting surface 204 of the base 202. The multiple metal layers include a fixed electrode metal layer (hereinafter "fixed electrode layer") 206, a movable (e.g., flexible, hinged) electrode metal layer (hereinafter "movable electrode layer") 208 on the fixed electrode layer 206, and a mirror metal layer (hereinafter "mirror layer") 210 on the movable electrode layer 208.

The fixed electrode layer 206 is on the mounting surface 204 of the base 202. As described above and illustrated in FIG. 4, the electrode layer is divided into N−1 electrode segments, where N is the number of target displacements. In the example electrostatic actuator 200 illustrated in FIGS. 5 and 6, the fixed electrode layer 206 is divided into first and second electrode segments (or plates) $E_1, E_2$. An electrode bias segment (or plate) $E_B$ is included to bias the voltage applied to the fixed electrode layer 206 to a reference voltage, which can be zero volts or a non-zero bias voltage.

A size or area and geometrical configuration of the multiple electrode segments $E_1, E_2$ are chosen based on electromechanical design simulations and depends on the non-linearity as a result of the initial electrostatic gap and maximum target displacement. The area of the multiple electrode segments $E_1, E_2$ is a fraction of the area of the fixed electrode layer 206 (or a total area of the electrode segments $E_1, E_2$, including the electrode bias segment $E_B$, combined). In addition, the geometrical configuration of the multiple electrode segments $E_1, E_2$ is symmetrical with respect to centered, orthogonal X-Y axes as illustrated in FIG. 7. The symmetrical configuration facilitates an even electrical distribution between the active electrode segment $E_1, E_2$ in the fixed electrode layer 206 and a movable electrode of the movable electrode layer 208 described below.

In the example illustrated in FIGS. 5-7, the multiple electrode segments $E_1, E_2$ have a square geometrical shape. In this example, the second electrode segment $E_2$, however, has a square shaped opening defined in its center such that the first electrode segment $E_1$ resides in the square shaped opening. Thus, the second electrode segment $E_2$ surrounds the first electrode segment $E_1$. In addition, as illustrated in FIG. 7, the electrode bias segment $E_B$ resides on a perimeter of the of the fixed electrode layer 206 such that the electrode bias segment $E_B$ surrounds both electrode segments E1, E2.

As a result, all the electrode segments $E_1, E_2$ and the electrode bias segment $E_B$ all are on the same plane defined by the X-Y axes.

The movable electrode layer 208 is on the fixed electrode layer 206. The movable electrode layer 208 is a movable layer that is displaced a distance toward the fixed electrode layer 206 based on the ON/OFF state of the memory cells. Specifically, the movable electrode layer 208 includes support pillars 212, elongated flexible beams 214 attached to the support pillars 212, and a movable electrode plate 216 attached to the flexible beams 214. The support pillars 212 are attached to the fixed electrode layer 206 at spaced locations around a perimeter of the fixed electrode layer 206. In the example illustrated in FIGS. 5-7, the support pillars 212 are in the corners of the electrode bias segment $E_B$ of the fixed electrode layer 206. The flexible beams 214 are attached at a proximate (first) end 218 to one of the support pillars 212 and attach at a distal (second) end 220 to the movable electrode plate 216. During activation of at least one of the electrode segments $E_1, E_2$, the movable electrode layer 208 flexes or hinges via the flexible beams 214 in a direction toward the fixed electrode layer 206.

The mirror layer 210 includes a mirror 222 that steers the light beam from the light source in a given direction. The mirror layer 210 is supported by multiple support posts 224 that are on the movable electrode plate 216 of the movable electrode layer 208 to provide a space between the mirror layer 210 and the movable electrode layer 208 Thus, when the movable electrode plate 216 is displaced, the mirror 222 is displaced by the same distance to thereby steer the light beam in the direction to produce the light beam output illustrated in FIG. 3. In other words, the mirror layer 210 is moves or is displaced by the same distance as the movable electrode plate 216 responsive to activation or deactivation of one or more of the multiple electrode segments $E_1, E_2$.

Figure 8:
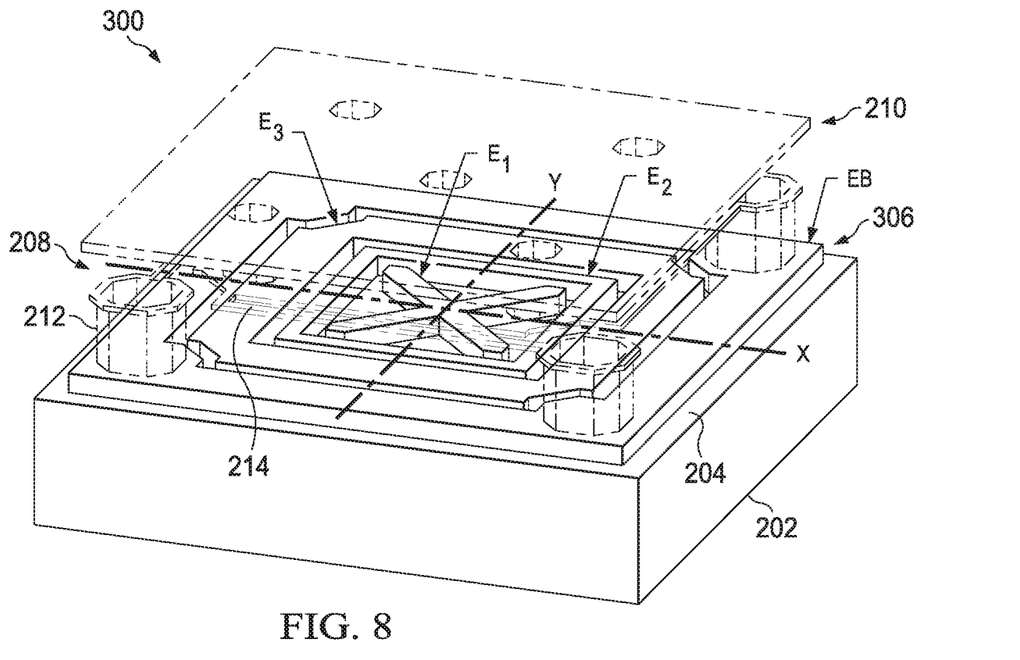
FIG. 8 is a perspective view of another example electrostatic actuator.

FIG. 8 is a perspective view of another example electrostatic actuator 300 (e.g., piston-mode actuator) similar to the electrostatic actuator 130 illustrated in FIG. 3. The electrostatic actuator 300 is the same as the electrostatic actuator 200 described above and illustrated in FIGS. 5-7 with the exception of the configuration of the fixed electrode layer. That is, the electrostatic actuator 300 includes the base 202 having the mounting surface 204, the movable electrode layer 208 that includes the support pillars 212, the flexible beams 214 attached to the support pillars 212, and the movable electrode plate (illustrated in FIG. 7) attached to the flexible beams 214. The electrostatic actuator 300 also includes the mirror layer 210 comprising the mirror 222 and the support posts 224 (illustrated in FIG. 7).

The electrostatic actuator 300, however, includes a fixed electrode layer 306 having an electrode plate divided into a first electrode segment (or plate) $E_1$, a second electrode segment (or plate) E2, and a third electrode segment (or plate) $E_3$. The fixed electrode layer 306 further includes an electrode bias segment $E_B$ to bias the voltage applied to the fixed electrode layer 306 to a reference voltage, which can be zero volts or a non-zero bias voltage.

A size or area and geometrical configuration of the multiple electrode segments $E_1, E_2, E_3$ is chosen based on electromechanical design simulations and depends on the non-linearity as a result of the initial electrostatic gap and maximum target displacement. In addition, the geometrical configuration of the multiple electrode segments $E_1, E_2, E_3$ is symmetrical with respect to an X-Y axis illustrated in FIG. 8. The area of the multiple electrode segments $E_1, E_2, E_3$ is a fraction of the area of the fixed electrode layer 306 (or a total area of the electrode segments $E_1, E_2, E_3$ including the electrode bias segment $E_B$, combined). The symmetrical configuration facilitates an even electrical distribution between the active electrode segment $E_1$, $E_2$, $E_3$ in the fixed electrode layer 306 and the movable electrode of the movable electrode layer 208.

In the example illustrated in FIG. 8, $E_2$ and $E_3$ have similar square shapes as $E_1$ and $E_2$ illustrated in FIGS. 5-7, where $E_2$ resides in a center opening defined in a center of $E_3$ described above. $E_1$, however, has an X-shape and resides in an X-shaped opening define in a center of $E_2$. Thus, both $E_1$ and $E_2$ reside in a center opening defined in $E_3$. Such that electrode segment $E_3$ surrounds the first and second electrode segments $E_1$, $E_2$. In addition, as illustrated in FIG. 7, the electrode bias segment $E_B$ resides on a perimeter of the of the fixed electrode layer 306 such that the electrode bias segment $E_B$ surrounds both electrode segments $E_1$, $E_2$. As a result, all the electrode segments $E_1$, $E_2$ and the electrode bias segment $E_B$ all are on the same plane defined by the X-Y axes.

Figure 9:
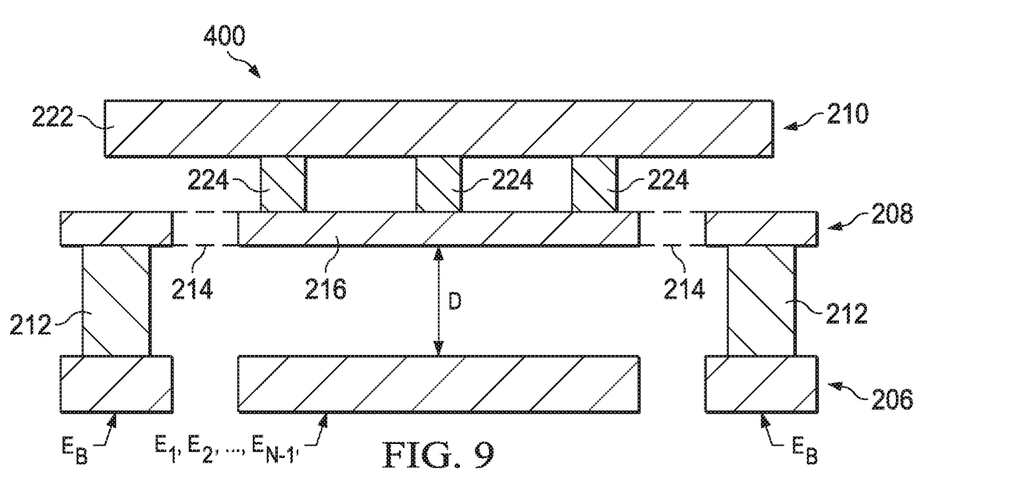
FIG. 9 is cross-section side view of an example electrostatic actuator in a non-actuated state.
Figure 10:
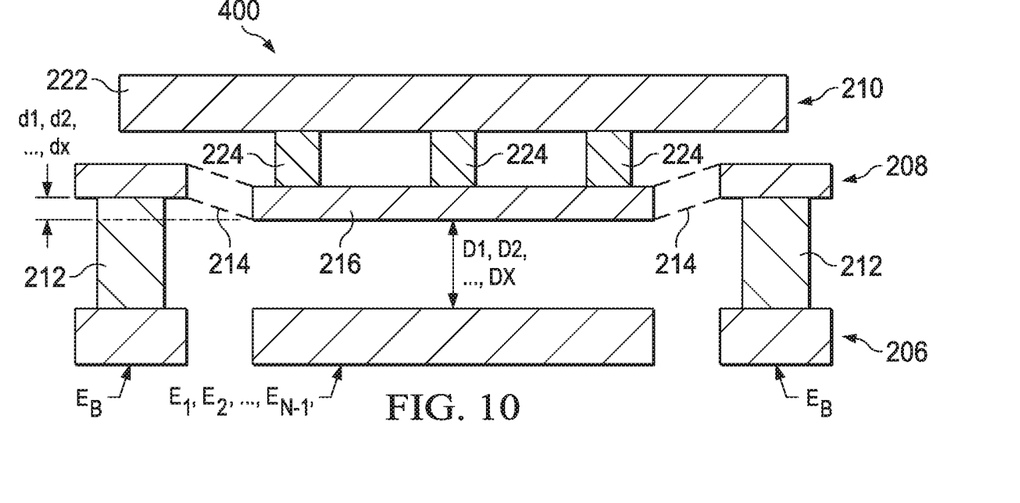
FIG. 10 is cross-section side view of the example electrostatic actuator of FIG. 9 in an actuated state.
Figure 11:
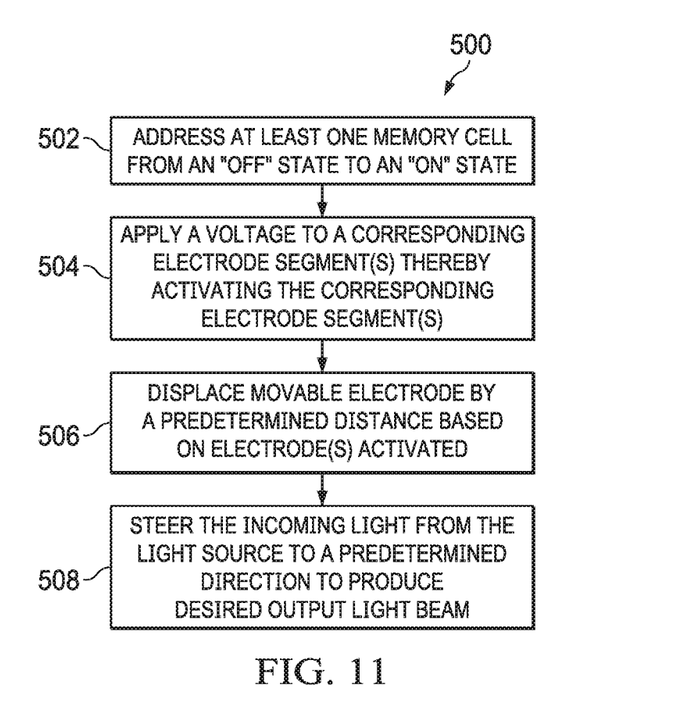
FIG. 11 is a block diagram illustration that describes the operation of an electrostatic actuator.

Referring to FIGS. 9-11, a method of operating an electrostatic actuator as disclosed herein will be described. FIGS. 9 and 10 are cross-section side views of an example electrostatic actuator (without a base) 400 that illustrate the operation of the example electrostatic actuator 400 as disclosed herein. FIG. 11 is a block diagram 500 illustration that describes the operation of the electrostatic actuator 400. The example electrostatic actuator 400 illustrated in FIGS. 9 and 10 is similar to the example electrostatic actuators illustrated in FIGS. 3-8. Thus, reference is to be made to the examples of FIGS. 3-8 in the following description of the example in FIGS. 9 and 10.

At 502, at least one memory cell (e.g., memory cell(s) $MC_1$, $MC_2$, ..., $MC_{N-1}$) is addressed to an "ON" (1) state from an "OFF" (0) state. At 504, a voltage is applied to an electrode segment(s) (e.g., electrode segment(s) $E_1$, $E_2$, ..., $E_{N-1}$) via electronic circuitry components (e.g., CMOS, SRAM) housed in a base (e.g., base 132, 202) thereby activating the electrode segment(s) (e.g., electrode segment(s) $E_1$, $E_2$, ..., $E_{N-1}$). As a result, an electric field is generated between the electrode segment(s) (e.g., electrode segment(s) $E_1$, $E_2$, ..., $E_{N-1}$) and a movable electrode (e.g., movable electrode 216) of a hinged layer (e.g., movable electrode layer 208). The electric field creates an electrostatic attraction between the electrode(s) (e.g., electrode(s) $E_1$, $E_2$, ..., $E_{N-1}$) and the movable electrode (e.g., movable electrode 216). At 506, the movable electrode (e.g., movable electrode 216) moves or is displaced by a distance (d1, d2, ..., dx) in a direction towards the electrode layer (e.g., fixed electrode layer 206). The distance (d1, d2, ..., dx) is based on which electrode(s) is/are activated. For example, in a two electrode (e.g., $E_1$, $E_2$) electrode configuration, the distance d1 could be associated with electrode segment $E_1$ being activated, distance d2 could be associated with electrode segment $E_2$ being activated, and distance d3 could be associated to both electrode segments $E_1$ and $E_2$ being activated.

As a result, a distance D between the movable electrode (e.g., movable electrode 216) and the electrode layer (e.g., fixed electrode layer 206) decreases to a distance of D1, D2, ..., DX based on which electrode(s) is/are activated. This in turn displaces the mirror (e.g., mirror 222) on the mirror layer (e.g., mirror layer 210) by a fraction of a wavelength of the light source (e.g., light source 120).

Figure 12:
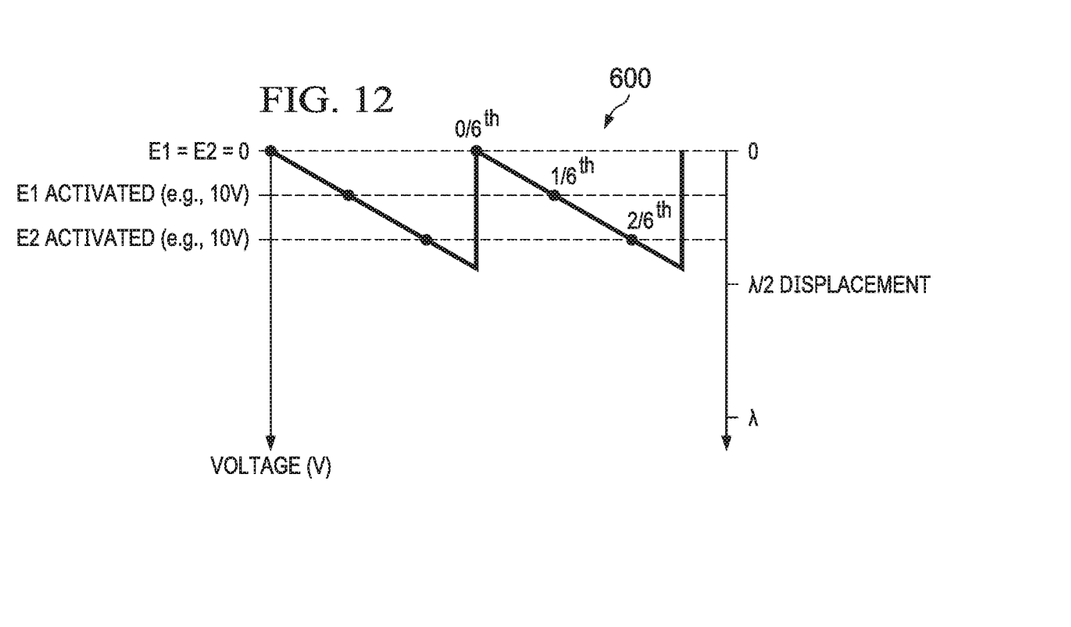
FIG. 12 is a graph illustrating the displacement for a red helium-neon (HeNe) laser.

For example, FIG. 12 is a graph 600 illustrating the displacement for a red helium-neon (HeNe) laser that has a wavelength of 632.8 nm. The displacement of the mirror (e.g., mirror 222) when neither electrode $E_1$, $E_2$ is activated is zero nm. The displacement of the mirror (e.g., mirror 222) when $E_1$ is activated is one-sixth (⅙) the wavelength or 105.5 nm. The displacement of the mirror (e.g., mirror 222) when $E_1+E_2$ is activated is two-sixths (one-third (⅓)) the wavelength or 210.9 nm. Thus, at 508, the displacement of the mirror steers a light beam output from the light source to the desired direction, as described herein.

Figure 13:
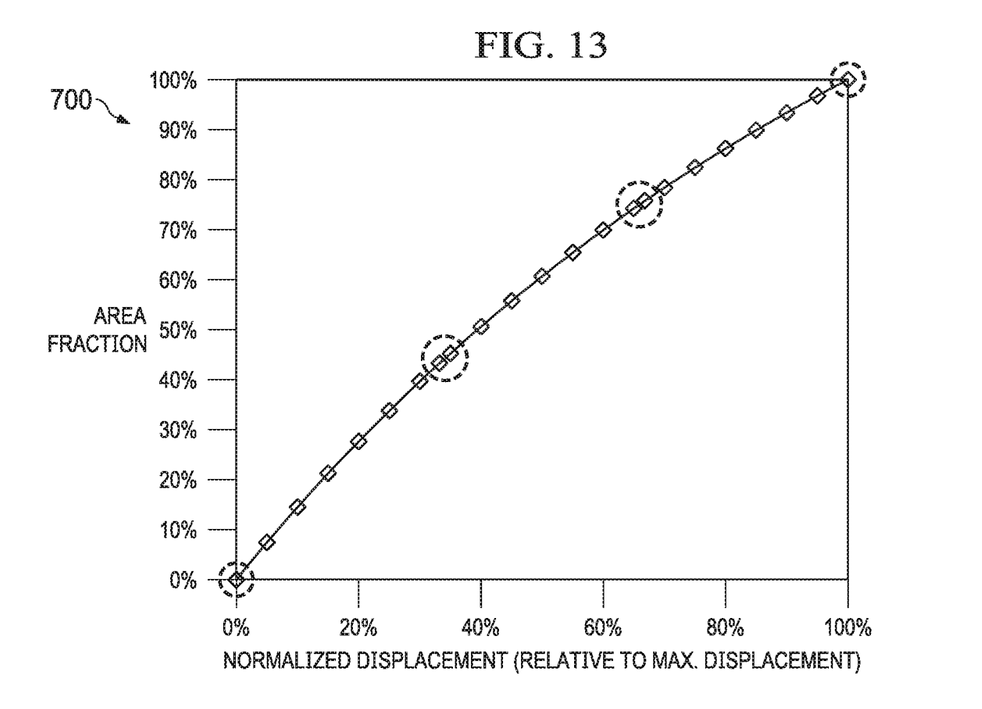
FIG. 13 represents linearization as a function of a fraction of the total electrode plate area activated versus a normalized displacement relative to maximum displacement of the actuator.

Referring to FIG. 13 and to TABLE 2 below, as mentioned above, in order to achieve linearization, the area of the multiple electrode segments must be carefully chosen based on electromechanical design simulations, and will depend on the non-linearity as a result of the initial electrostatic gap and maximum displacement target. As previously described, the target displacement is achieved by activating one of the electrode segments or a combination of electrode segments by addressing respective underlying memory cell(s) from an "OFF" (0) state to an "ON" (1) state.

For example, TABLE 2 below illustrates an example electrode segment area selection for a three electrode segment ($E_1$, $E_2$, $E_3$), four-position actuator (the bias electrode segment ($E_B$) is not shown in this example for simplicity). FIG. 13 is a graph 700 that represents linearization as a function of a fraction of the total electrode plate area activated versus a normalized displacement relative to maximum displacement of the actuator. In this example, the area of the multiple electrode segments as a percentage of the total electrode plate area is electrode segment $E_1$ area=19%, electrode segment $E_2$ area=24%, and electrode segment $E_3$ area=57%. The initial gap (d) is 1.4 um and the maximum displacement of the actuator is 0.2373 um. In this example, the desired displacement targets are 0%, 33.33%, 66.67%, and 100% of the maximum displacement. Thus, in order to achieve linear displacement, as illustrated in FIG. 13, the electrode segment areas required are 0%, 43%, 76%, and 100% of the total electrode plate area, see TABLE 2 below.

TABLE 2

| TARGET DISPLACEMENT | | | AREA FRACTION |
|---|---|---|---|
| Percent | x (um) | x/d | Percent |
| 0% | 0 | 0 | 0.0% |
| 5% | 0.01186 | 0.00847 | 7.1% |
| 10% | 0.02373 | 0.01695 | 14.0% |
| 15% | 0.03560 | 0.02542 | 20.7% |
| 20% | 0.04746 | 0.03390 | 27.1% |
| 25% | 0.05933 | 0.04237 | 33.2% |
| 30% | 0.07119 | 0.05085 | 39.2% |
| 33.33% | 0.07910 | 0.05650 | 43.0% |
| 35% | 0.08306 | 0.05933 | 44.9% |
| 40% | 0.09492 | 0.06780 | 50.4% |
| 45% | 0.10679 | 0.07628 | 55.7% |
| 50% | 0.11865 | 0.08475 | 60.7% |
| 55% | 0.13052 | 0.09323 | 65.6% |
| 60% | 0.14238 | 0.10170 | 70.2% |
| 65% | 0.15425 | 0.11018 | 74.6% |
| 66.67% | 0.15820 | 0.11300 | 76.0% |
| 70% | 0.16110 | 0.11865 | 78.8% |
| 75% | 0.17798 | 0.12713 | 82.8% |
| 80% | 0.18984 | 0.13560 | 86.7% |
| 85% | 0.20171 | 0.14408 | 90.3% |
| 90% | 0.21357 | 0.15255 | 93.7% |
| 95% | 0.22544 | 0.16103 | 96.9% |
| 100% | 0.23730 | 0.16950 | 100.0% |

TABLE 3 below represents the memory cells $MC_1$, $MC_2$, $MC_3$ that are associated with the electrode segments $E_1$, $E_2$, $E_3$ illustrated in the above example. The multiple electrode segments $E_1$, $E_2$, $E_3$ connect to a separate memory cell. Thus, the combination of memory cells $MC_1$, $MC_2$, $MC_3$ that can be addressed to an "ON" state is eight. In this example, as illustrated in TABLE 3, only four address states are used to achieve the linearization illustrated in the graph 700 in FIG. 13.

TABLE 3

| $MC_1$ | $MC_2$ | $MC_3$ | TOTAL ELECTRODE AREA ACTIVATED | DISPLACEMENT |
|---|---|---|---|---|
| 0 | 0 | 0 | 0% | 0% |
| 1 | 0 | 0 | 19% | Unused |
| 0 | 1 | 0 | 24% | Unused |
| 1 | 1 | 0 | 43% | 33.33% |
| 0 | 0 | 1 | 57% | Unused |
| 1 | 0 | 1 | 76% | 66.67% |
| 0 | 1 | 1 | 81% | Unused |
| 1 | 1 | 1 | 100% | 100% |

Referring to TABLE 4 below, in another embodiment of the above example, a unique, individual voltage can be assigned to the multiple electrode segments. For example, a voltage $V_1$ can be assigned to electrode segment $E_1$, voltage $V_2$ can be assigned to electrode segment $E_2$, and voltage $V_3$ can be assigned to electrode segment $E_3$. Thus, when the appropriate voltage activates the respective electrode segment or a combination thereof, the actuator will displace the mirror to steer the light beam in the appropriate direction. As above, in this example as illustrated in TABLE 4, only four address states are used to achieve the linearization illustrated in the graph 700 in FIG. 13.

In addition, the voltages could be trimmed individually for the finished actuator, thereby allowing compensation of unintended manufacturing process variations. As a result, displacement can be achieved by one of two embodiments; electrode segment area and assigned voltages to the multiple electrode segments.

TABLE 4

| E1 @ V1 | E2 @ V2 | E3 @ V3 | TOTAL ELECTRODE AREA ACTIVATED | DISPLACEMENT |
|---|---|---|---|---|
| 0 | 0 | 0 | 0% | 0% |
| V1 | 0 | 0 | 19% | Unused |
| 0 | V2 | 0 | 24% | Unused |
| V1 | V2 | 0 | 43% | 33.33% |
| 0 | 0 | V3 | 57% | Unused |
| V1 | 0 | V3 | 76% | 66.67% |
| 0 | V2 | V3 | 81% | Unused |
| V1 | V2 | V3 | 100% | 100% |

In this description, the term "based on" means based at least in part on.

Modifications are possible in the described embodiments, and other embodiments are possible, within the scope of the claims.

What is claimed is:

1. A device comprising:
   a substrate comprising:
      a first memory cell;
      a second memory cell; and
      an electronic circuit coupled to the first memory cell and to the second memory cell;
   a fixed electrode layer on the substrate, the fixed electrode layer comprising:
      a first electrode segment coupled to the first memory cell via the electronic circuit; and
      a second electrode segment coupled to the second memory cell via the electronic circuit, the second electrode segment surrounding the first electrode segment;
   a movable electrode layer on the fixed electrode layer; and
   a mirror layer on the movable electrode layer, the mirror layer comprising a mirror.

2. The device of claim 1, wherein the fixed electrode layer further comprises a bias electrode segment surrounding the second electrode segment.

3. The device of claim 2, wherein the fixed electrode layer further comprises a third electrode segment surrounding the second electrode segment, the bias electrode segment surrounding the third electrode segment.

4. The device of claim 3, wherein the first electrode segment has a first area, the second electrode segment has a second area, and the third electrode segment has a third area, wherein a sum of the first area, the second area, and the third area is an electrode area, wherein the first area is 19% the electrode area, the second area is 24% the electrode area, and the third area is 57% the electrode area.

5. The device of claim 1, wherein the first electrode segment is symmetrical along a first axis and a second axis, the second axis orthogonal to the first axis, and the second electrode segment is symmetrical along the first axis and the second axis.

6. The device of claim 1, wherein the first electrode segment is square.

7. The device of claim 1, wherein the first electrode segment is X-shaped.

8. The device of claim 1, wherein responsive to a first value of the first memory cell and a second value of the second memory cell, the mirror is a first distance from the fixed electrode layer, a second distance from the fixed electrode layer, or a third distance from the fixed electrode layer, wherein a first difference between the first distance and the second distance is approximately the same as a second difference between the second distance and the third distance.

9. The device of claim 8, wherein the first electrode segment has a first applied voltage and the second electrode segment has a second applied voltage, the second applied voltage different from the first applied voltage.

10. A device comprising:
    a substrate comprising:
       a first memory cell; and
       a second memory cell;
    a fixed electrode layer on the substrate, the fixed electrode layer comprising:
       a first electrode segment coupled to the first memory cell, the first memory cell configured to apply a first voltage to the first electrode segment; and
       a second electrode segment coupled to the second memory cell, the second memory cell configured to apply a second voltage to the second electrode segment;
    a movable electrode layer on the fixed electrode layer; and
    a mirror layer on the movable electrode layer, the mirror layer comprising a mirror, wherein responsive to the first memory cell and the second memory cell, the mirror is a first distance from the fixed electrode layer, a second distance from the fixed electrode layer, or a third distance from the fixed electrode layer, wherein a first difference between the first distance and the second distance is approximately the same as a second difference between the second distance and the third distance.

11. The device of claim 10, wherein responsive to the first memory cell and the second memory cell, the mirror is a fourth distance from the fixed electrode layer, wherein a third difference between the fourth distance and the third distance is approximately the same as the first distance.

12. The device of claim 10, wherein the second electrode segment surrounds the first electrode segment.

13. The device of claim 12, the fixed electrode layer further comprising a bias electrode segment surrounding the second electrode segment.

14. The device of claim 13, the fixed electrode layer further comprising a third electrode segment, the third electrode segment surrounding the second electrode segment and the bias electrode segment surround the third electrode segment.

15. The device of claim 10, wherein the first electrode segment is symmetrical along a first axis and a second axis, the second axis orthogonal to the first axis, and the second electrode segment is symmetrical along the first axis and the second axis.

16. A system comprising:
a controller; and
a microelectromechanical system (MEMS) device coupled to the controller, the MEMS device comprising:
a substrate comprising:
a first memory cell coupled to the controller, the controller configured to load a first value or a second value in the first memory cell; and
a second memory cell coupled to the controller, the controller configured to load the first value or the second value in the second memory cell;
a fixed electrode layer on the substrate, the fixed electrode layer comprising:
a first electrode segment coupled to the first memory cell, the first memory cell configured to apply a first voltage to the first electrode segment; and
a second electrode segment coupled to the second memory cell, the second memory cell configured to apply a second voltage to the second electrode segment;
a movable electrode layer on the fixed electrode layer; and
a mirror layer on the movable electrode layer, the mirror layer comprising a mirror, wherein responsive to the first memory cell and the second memory cell, the mirror is a first distance from the fixed electrode layer, a second distance from the fixed electrode layer, or a third distance from the fixed electrode layer, wherein a first difference between the first distance and the second distance is approximately the same as a second difference between the second distance and the third distance.

17. The system of claim 16, further comprising a light source coupled to the controller, the light source optically coupled to the mirror.

18. The system of claim 16, wherein the second electrode segment surrounds the first electrode segment.

19. The system of claim 18, wherein the fixed electrode layer further comprises:
a third electrode segment surrounding the second electrode segment; and
a bias electrode surrounding the third electrode segment.

20. The system of claim 16, wherein the first electrode segment has a first applied voltage and the second electrode segment has a second applied voltage, the second applied voltage different from the first applied voltage.

* * * * *